US007788306B2

(12) United States Patent
Dykes et al.

(10) Patent No.: US 7,788,306 B2
(45) Date of Patent: Aug. 31, 2010

(54) ON-DEMAND NUMERICAL CONVERSION

(75) Inventors: Pernell James Dykes, Byron, MN (US); Chun-Tao Li, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1083 days.

(21) Appl. No.: 11/457,290

(22) Filed: Jul. 13, 2006

(65) Prior Publication Data

US 2008/0016445 A1 Jan. 17, 2008

(51) Int. Cl.
*G06F 5/00* (2006.01)

(52) U.S. Cl. ...................................................... 708/206

(58) Field of Classification Search ....................... None
See application file for complete search history.

(56) References Cited

U.S. PATENT DOCUMENTS

| | | | | |
|---|---|---|---|---|
| 3,639,733 | A * | 2/1972 | Larson | 235/69 |
| 6,636,880 | B1 * | 10/2003 | Bera | 708/206 |
| 7,280,997 | B2 * | 10/2007 | Sasaki et al. | 1/1 |
| 7,395,287 | B2 * | 7/2008 | Chambers et al. | 708/206 |
| 7,421,648 | B1 * | 9/2008 | Davis | 715/234 |
| 2007/0276699 | A1 * | 11/2007 | De Villiers et al. | 705/3 |
| 2007/0296990 | A1 * | 12/2007 | Kakutani | 358/1.9 |
| 2009/0204470 | A1 * | 8/2009 | Weyl et al. | 705/9 |
| 2009/0210213 | A1 * | 8/2009 | Cannon et al. | 704/2 |

* cited by examiner

*Primary Examiner*—David H Malzahn
(74) *Attorney, Agent, or Firm*—Wood, Herron & Evans LLP

(57) ABSTRACT

An apparatus, program product and method provide on-demand numerical conversion of convertible numerical values such as measurements and monetary values. A numerical value that is displayed in a document such as a web page, and that is represented in a native unit, may be converted to a value represented in a local unit for a user viewing the document. That converted numerical value may then be displayed adjacent the original numerical value, and typically along with an indication of the local unit, in response to the user positioning a pointer over the original (unconverted) numerical value, so that the user can quickly comprehend the numerical value in units to which he or she is accustomed.

25 Claims, 3 Drawing Sheets

ON-DEMAND NUMERICAL CONVERSION

FIELD OF THE INVENTION

The present invention generally relates to computers and computer software, and more particularly, to conversion of numerical values such as measurements and monetary values between different units.

BACKGROUND OF THE INVENTION

The Internet has grown at a remarkable pace, and has become firmly entrenched in nearly all aspects of society. Whereas the Internet initially was limited to purely academic and government endeavors, the Internet has now become an important avenue of commercial activity, not to mention an important source of educational, commercial and entertainment-related information. Moreover, in addition to simply operating as a source of information, the Internet provides a mechanism for bringing together individuals and entities from across the globe.

In particular, given the global nature of the Internet, users often access web pages originating in different countries or regions of the world. While the world continues to get smaller, and different cultures continue to mix, there are still substantial differences between different countries and regions that can make it difficult for a person from one country or region to fully understand online content that originates in another country or region.

Language is of course one area that may inhibit a person's ability to comprehend online content originating in different countries or regions. Various translation tools, however, have been developed to enable, for example, web pages to be automatically translated into different languages.

Even when web pages are in a user's native language, however, a user may still face a comprehension problem due to the numerical values that are incorporated into online content such as web pages. For example, while the United States continues to rely predominantly on English or imperial standards for many units of measurement, most of the rest of the world has transitioned to the metric system. While much of the scientific community in the United States is well versed on the metric system, most laymen in the United States have only a passing understanding. Thus, for example, if a typical user in the United States was planning a trip to the United Kingdom, and was looking at UK web sites for travel information such as normal temperatures and distances between cities, the user would typically be presented with numerical values that are in native units for UK residents, i.e., temperatures in Celsius, rather than Fahrenheit, and distances in kilometers, rather than in miles. Even if the user understood the relationship between these different units of measurement, e.g., that a mile is equal to 1.6 kilometers, the user would still be required to mentally perform the conversion to convert the numerical values to units to which he or she was accustomed.

Likewise, other types of numerical values, e.g., monetary amounts, may vary in different locales, and often are based upon an exchange rate that varies day to day. As such, a user in the United States, accustomed to monetary amounts represented in terms of U.S. Dollars, would likely be presented with costs represented in British Pounds when viewing UK web sites, and accordingly would be required to know at least a general estimate of the current exchange rate even to mentally determine a rough approximation of the corresponding amounts in U.S. Dollars.

Various automated tools have been developed to facilitate the conversion of numerical values between different units. Specific web sites have been developed that enable a user to manually input a number in one unit, and then output the corresponding number in another unit. Search engines may also be used to obtain conversion formulas to enable users to perform conversions manually or with a calculator. Some calculators also provide the ability to convert numbers between different units. In each of these instances, however, whenever a user comes across a numerical value in a web page that he or she needs to convert to a unit with which he or she is accustomed, the user is often required to divert his or her attention away from the web page at least briefly, which can decrease the user's efficiency and otherwise distract the user.

In addition, some web sites support the ability to customize their web pages for different users. For example, some ecommerce web sites permit users to select a home country, such that the web pages communicated to different users will be customized for the home countries of those respective users. Such customization permits products to be priced out in the units of currency for different countries. In many instances, however, such pricing may not be based upon any particular exchange rate, but rather may be based upon the price that the seller has chosen to charge in different countries. In addition, the customization of web pages to support different countries is a server-based solution, and thus is only available on web sites that specifically provide such functionality.

Therefore, a significant need exists for a more universal, less intrusive and flexible manner of providing conversions of numerical values between different units.

SUMMARY OF THE INVENTION

The invention addresses these and other problems associated with the prior art by providing an apparatus, program product and method that provide on-demand numerical conversion of convertible numerical values such as measurements and monetary values. A numerical value that is displayed in a document such as a web page, and that is represented in a native unit, may be converted to a value represented in a local unit for a user viewing the document. That converted numerical value may then be displayed adjacent the original numerical value, and typically along with an indication of the local unit, in response to the user positioning a pointer over the original (unconverted) numerical value, so that the user can quickly comprehend the numerical value in units to which he or she is accustomed.

Therefore, consistent with one aspect of the invention, numerical conversion may be performed by detecting user positioning of a user manipulated pointer over a convertible numerical value in a displayed portion of a computer document, converting the convertible numerical value to a local unit associated with the user, and displaying the converted numerical value proximate the convertible numerical value in the displayed portion of the document.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The herein-described embodiments enable users to view converted representations of numerical values such as measurements and monetary values on-demand, and to do so in a manner that enables users to view the converted representations alongside the original (unconverted) representations so as to enable such users to appreciate the relationship between the converted and unconverted representations.

A numerical value capable of being processed by on-demand conversion may represent any quantitative value capable of being represented in more than one unit, and thus capable of being converted between different units. In this regard, a numerical value is considered to be "convertible" if that numerical value is capable of being converted from the unit in which it is currently represented to another unit, while a converted numerical value represents the value after the conversion has been performed.

A numerical value may represent, for example, a measurement, e.g., length, area, volume, mass, weight, time, density, temperature, velocity, acceleration, force, electrical, or any other suitable scientific or technical value, whereby the various units for a numerical value may be different depending upon the type of numerical value (e.g., meters, inches, etc. for length, pounds or kilograms for weight, etc.). A numerical value may also represent a monetary amount, whereby the various units for a numerical value may differ based upon locale or system of currency, e.g., U.S. Dollars, British Pounds, Euros, etc. In this regard, the conversion of a numerical value between units may be based upon a fixed formula derived from a physical or scientific equation (e.g., 1 inch=2.54 cm), or may be based upon a variable formula that changes from time to time (e.g., based upon an exchange rate).

The units for which it may be desirable to convert numerical values often differ from one another based upon the inclusion of the units in different standards, e.g., the metric system (or International System of Units) vs. the English or imperial measurement system still widely used in the United States. While it may be desirable to convert between units in the same metric or standard (e.g., to convert between centimeters and millimeters), often it is desirable to convert between units of different metrics or standards given that users often are more versed with one standard over another (e.g., Europeans are typically no longer well versed in English measurements).

Figure 1:
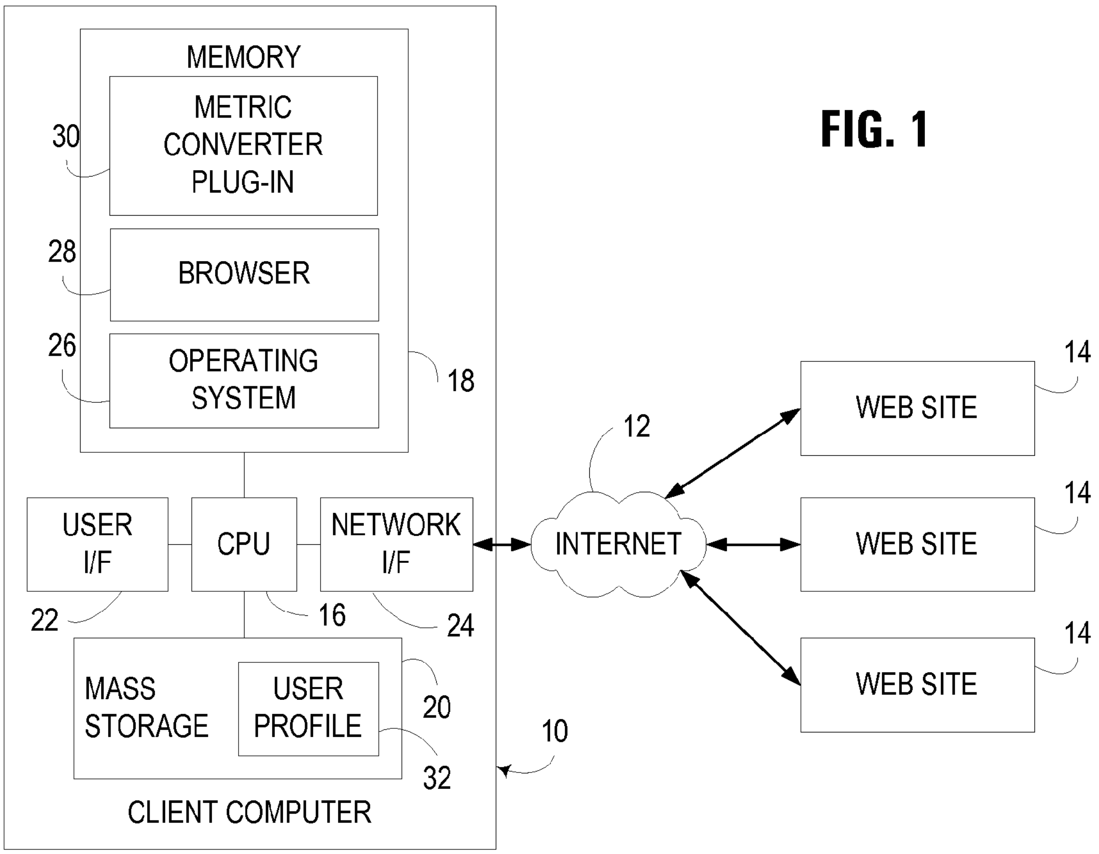
FIG. 1 is a block diagram of a computer system incorporating on-demand numerical conversion consistent with the invention.

Turning now to the Drawings, wherein like numbers denote like parts throughout the several views, FIG. 1 illustrates an exemplary computer system 10 within which on-demand numerical conversion may be performed in a manner consistent with the invention. System 10 includes at least one apparatus, e.g., a client computer, coupled via a network such as the Internet 12 to one or more server computers, or web sites 14. For the purposes of the invention, computer 10, as well as each web site 14, may represent practically any type of computer, computer system or other programmable electronic device. Moreover, each of computer 10 and web sites 14 may be implemented using one or more networked computers, e.g., in a cluster or other distributed computing system. In the alternative, on-demand numerical conversion consistent with the invention may be implemented within a single computer or other programmable electronic device, e.g., a single-user computer or a multi-user computer.

Computer 10 typically includes a central processing unit 16 including at least one microprocessor coupled to a memory 18, which may represent the random access memory (RAM) devices comprising the main storage of computer 10, as well as any supplemental levels of memory, e.g., cache memories, non-volatile or backup memories (e.g., programmable or flash memories), read-only memories, etc. In addition, memory 18 may be considered to include memory storage physically located elsewhere in computer 10, e.g., any cache memory in a processor in CPU 16, as well as any storage capacity used as a virtual memory, e.g., as stored on a mass storage device 20 or on another computer coupled to computer 10. Computer 10 also typically receives a number of inputs and outputs for communicating information externally. For interface with a user or operator, computer 10 typically includes a user interface 22 incorporating one or more user input devices (e.g., a keyboard, a mouse, a trackball, a joystick, a touchpad, and/or a microphone, among others) and a display (e.g., a CRT monitor, an LCD display panel, and/or a speaker, among others). Otherwise, user input may be received via another computer or terminal.

For additional storage, computer 10 may also include one or more mass storage devices 20, e.g., a floppy or other removable disk drive, a hard disk drive, a direct access storage device (DASD), an optical drive (e.g., a CD drive, a DVD drive, etc.), and/or a tape drive, among others. Furthermore, computer 10 may include an interface 24 with one or more networks 12 (e.g., a LAN, a WAN, a wireless network, and/or the Internet, among others) to permit the communication of information with other computers and electronic devices. It should be appreciated that computer 10 typically includes suitable analog and/or digital interfaces between CPU 16 and each of components 18, 20, 22 and 24 as is well known in the art.

Computer 10 operates under the control of an operating system 26, and executes or otherwise relies upon various computer software applications, components, programs, objects, modules, data structures, etc. (e.g., a browser 28 with a metric converter plug-in 30). Moreover, various applications, components, programs, objects, modules, etc. may also execute on one or more processors in another computer coupled to computer 10 via a network, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to tangible, recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

In the illustrated implementation, on-demand numerical conversion is implemented in a browser, e.g., using a plug-in 30 in a conventional browser 28 to permit numerical values in web pages downloaded from the Internet to be converted on-demand. Those skilled in the art will recognize, however, that the exemplary environment illustrated in FIG. 1 is not intended to limit the present invention. Indeed, those skilled in the art will recognize that other alternative hardware and/or software environments may be used without departing from the scope of the invention. For example, on-demand numerical conversion functionality may be integrated into the program code for a browser, or into another application that displays documents other than web pages. On-demand numerical conversion functionality may also be implemented within an operating system. Furthermore, on-demand numerical conversion may be performed in a distributed manner, e.g., using a central server to perform some of the functionality associated with on-demand numerical conversion.

Furthermore, in the illustrated implementation, on-demand numerical conversion is based in part upon user preference data that identifies, for each of one or more types of convertible numerical values, a preferred unit or standard of units for that type of convertible numerical value. It may be desirable, for example, to store user preference data in a user profile, e.g., user profile 32 illustrated in FIG. 1, which may include other profile information regarding the user. These preferred units, or standards of units, are referred to herein as local units, as they are local to the user and his or her computer. Local units are contrasted with native units, which represent the units of numerical values incorporated into the original web pages and other documents retrieved by the user. As will become more apparent below, on-demand numerical conversion is typically performed when the native unit for a particular numerical value in a document is different from the local unit associated with the user viewing that document.

User preference data may be stored and managed by operating system 26, or may alternately be stored and managed by browser 28 or plug-in 30. Furthermore, the user preference data may be stored remotely, e.g., on a network server, and retrieved by plug-in 30 as necessary.

Local units for a particular user may be directly selected by the user on a unit-by-unit basis, or alternatively, local units may be selected in groups, e.g., by standard or metric. For example, a user may be able to select “metric system” or “English system” and have the local units for numerous types of numerical values set accordingly. Local units may also be selected inferentially or indirectly, e.g., based upon a user's known location. For example, local units may be selected based upon a user's native language, country, time-zone, etc., e.g., as is typically stored in the user profiles of conventional operating systems. Such selections may only be default selections, and may permit users to override the default selections. As such, a user known to be in the United States may be defaulted to the English units, with an ability provided for the user to select metric units instead if so desired.

In addition, even in instances where a user selects a group of local units, individual units within such groups may be selectively overridden by a user. Furthermore, a user may be able to customize the local units to use for different types of conversions. For example, a meter may be represented in the English system in a wide variety of ways, e.g., as 1.09 yards, 3.28 feet, 39.37 inches, 39⅜ inches, 3 feet and 3.37 inches, etc., and a user may be able to select a specific local unit display format in some embodiments of the invention. In addition, in some embodiments it may be desirable to enable a user to input additional customized conversions, e.g., to accommodate conversions that are not natively supported by the converter.

Embodiments consistent with the invention typically implement on-demand numerical conversion in response to detecting the movement of a user manipulated pointer (e.g., via user manipulation of a GUI pointer via a mouse, touchpad, track ball, cursor key, touch screen input, gesture, voice or other suitable user input) over a region in a document within which a convertible numerical value is located. Whenever a pointer is manipulated in such a manner, and when the native unit for the convertible numerical value does not match the local unit for that value, a converted numerical value is displayed proximate to or adjacent to the convertible numerical value, desirably along with an identification of the local unit for the value, and desirably without substantially occluding the convertible numerical value so that the two values are concurrently displayed and the user can readily ascertain the relationship between the two values.

Figure 2:
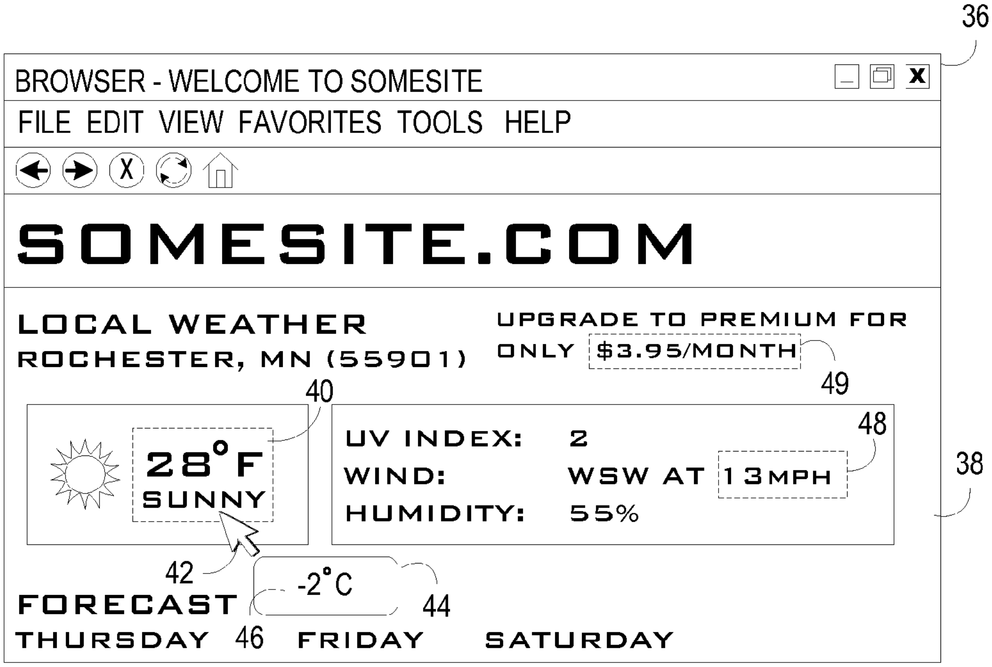
FIG. 2 is a block diagram of an exemplary display window for the browser referenced in FIG. 1, illustrating the display of a converted numerical value using on-demand numerical conversion consistent with the invention.

In one embodiment of the invention, the display of the converted numerical value is implemented within a pop-up window, e.g., a dialog box, a tool tip, a “bubble” or other suitable graphical control, and typically adjacent to or proximate to the pointer. FIG. 2, for example, illustrates an exemplary browser window 36 for a browser utilizing a metric converter plug-in incorporating on demand numerical conversion functionality. Window 36 is shown displaying a web page 38 from a web site with a domain of “somesite.com,” and displaying, as a representative example, a weather page for Rochester, Minn.

Web page 38 includes a first region 40 within which is displayed a first convertible numerical value, here a temperature value of “28.” As can be seen from the figure, the native unit for the convertible numerical value is degrees Fahrenheit. Assuming, for example, that the local unit for temperature for the user is degrees Celsius, the metric converter plug-in described hereinafter will automatically detect the movement of a user manipulated pointer 42 over region 40 and perform on-demand numerical conversion, and as a result display a pop-up window 44 within which is disposed a converted numerical value 46, here the same temperature reading converted to degrees Celsius. Desirably, the local unit (degrees Celsius) is also displayed adjacent the converted numerical value.

FIG. 2 also illustrates a second region 48 disposed around another numerical value, a measurement of wind velocity represented in miles per hour units, and a third region 49 disposed around yet another numerical value, a monetary value represented in United States Dollars. It will be appreciated that, for example, if the local unit for velocity was kilometers per hour, moving the pointer over region 48 would generate a pop-up window displaying the corresponding wind velocity in the local unit. Likewise, if the local unit for currency was British Pounds, moving the pointer over region 49 would generate a pop-up window displaying the corresponding monetary amount in British Pounds, e.g., based upon the current exchange rate. In this regard, it may be desirable in some instances for the metric converter plug-in to access a current exchange rate (or other variable rate as appropriate for the units involved) in connection with performing a conversion, e.g., by accessing a web site prior to performing the conversion.

Figure 3:
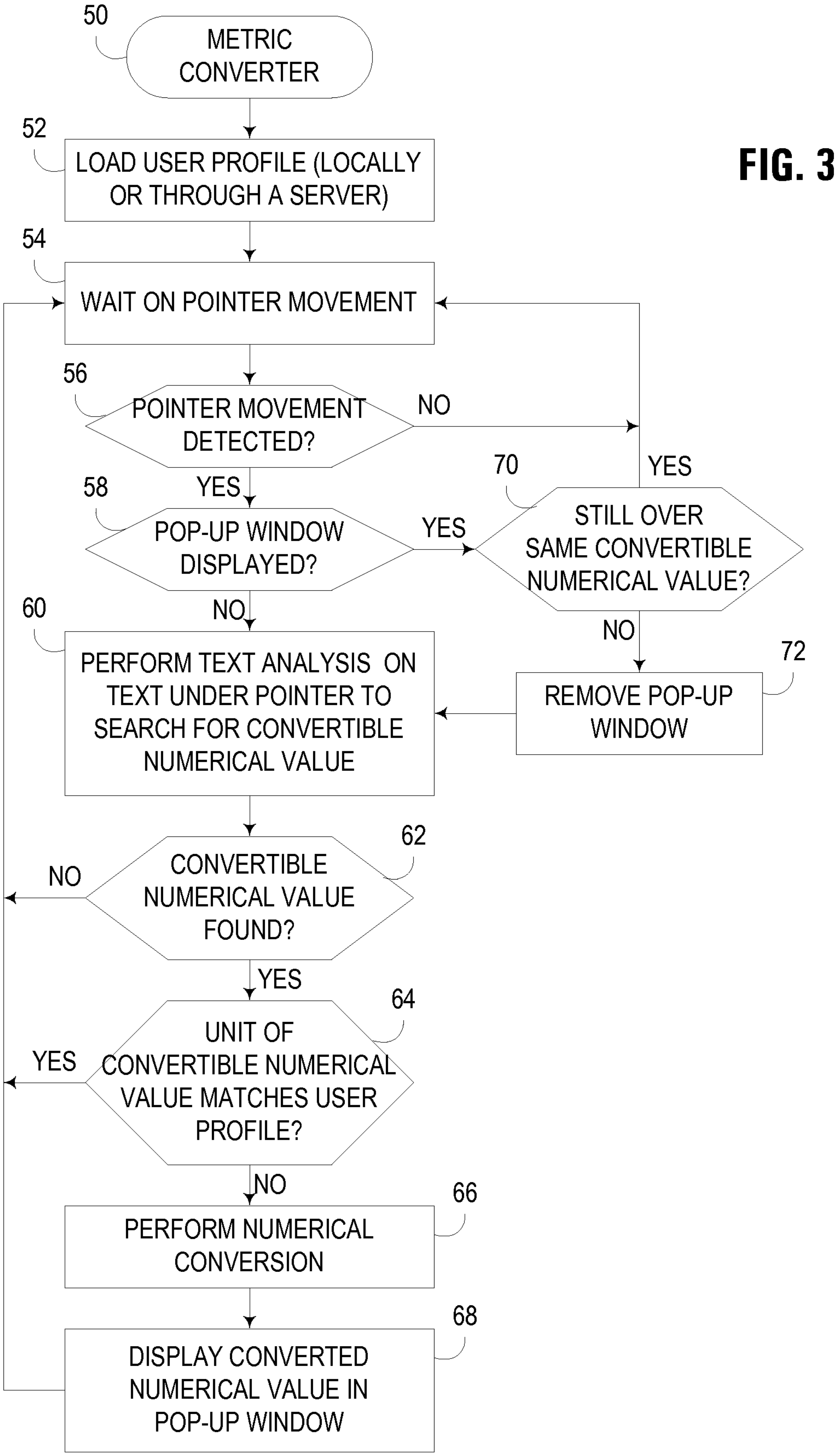
FIG. 3 is a flowchart illustrating the program flow of a metric converter routine executed by the computer system of FIG. 1.

FIG. 3 illustrates one exemplary implementation of a metric converter routine 50 executed by the illustrated metric converter plug-in 30 (FIG. 1). It will be appreciated that plug-in 30 is a "metric" converter from the standpoint that the plug-in is configured to convert between different metrics or standards. It will also be appreciated that routine 50 need not be implemented in a plug-in, but may be implemented in any suitable program code capable of being executed on a user computer.

Routine 50 begins in block 52 by loading the user profile, typically either locally, or alternatively remotely if the user profile is stored on a server. Next, block 52 waits on pointer movement. If pointer movement is detected, block 56 passes control to block 58. Otherwise, control returns to block 54 to continue to wait on pointer movement.

If pointer movement is detected, block 58 determines whether a pop-up window is already displayed. Assuming that no window is currently displayed, control passes to block 60 to perform text analysis on the text currently disposed under the pointer to attempt to locate a convertible numerical value, e.g., by performing a text string search for various types of unit identifiers in the text (e.g., "$", "mph", "° F.", etc.) to identify both the native unit and to identify a nearby numerical value.

Block 62 then determines whether a convertible numerical value was found, and if not, returns control to block 54. If a convertible numerical value is found, however, control passes to block 64 to determine whether the native unit for the convertible numerical value matches the local unit in the user profile. If so, no conversion is required, so control returns to block 54. If the units do not match, however, control passes to block 66 to perform the numerical conversion, and then to block 68 to display the converted numerical value in a pop-up window adjacent the pointer. As noted above, it is also desirable to identify the local unit for the converted numerical value in the pop-up window as well. Once the pop-up window is displayed, control returns to block 54.

Returning to block 58, if pointer movement is detected while the pop-up window is displayed, control passes to block 70 to determine whether the pointer is still disposed over the same convertible numerical value for which the pop-up window was generated. If so, control returns to block 54. Otherwise, block 70 passes control to block 72 to remove the pop-up window. Control then passes to block 60 to look for a convertible numerical value in the new region over which the pointer is disposed.

It will be appreciated that pointer movement may be detected in a number of manners consistent with the invention. For example, routine 50 may monitor for pointer movement events such as mouseover, mouseenter, mouseout, mousemove events. In addition, it will be appreciated that the region searched upon detecting pointer movement may vary in different embodiments. The region may be based, for example, upon a certain distance from the pointer position, upon the graphical object over which the pointer is positioned, upon a number of words in either direction of the current text over which the pointer is positioned, etc. In addition, it will be appreciated that rather than requiring a user to merely position a pointer over a numerical value, some embodiments may further require a user to explicitly request the conversion, e.g., via clicking or double-clicking on the numerical value. In such embodiments, the detection of pointer movement may further be responsive to events such as click or double-click events.

Figure 4:
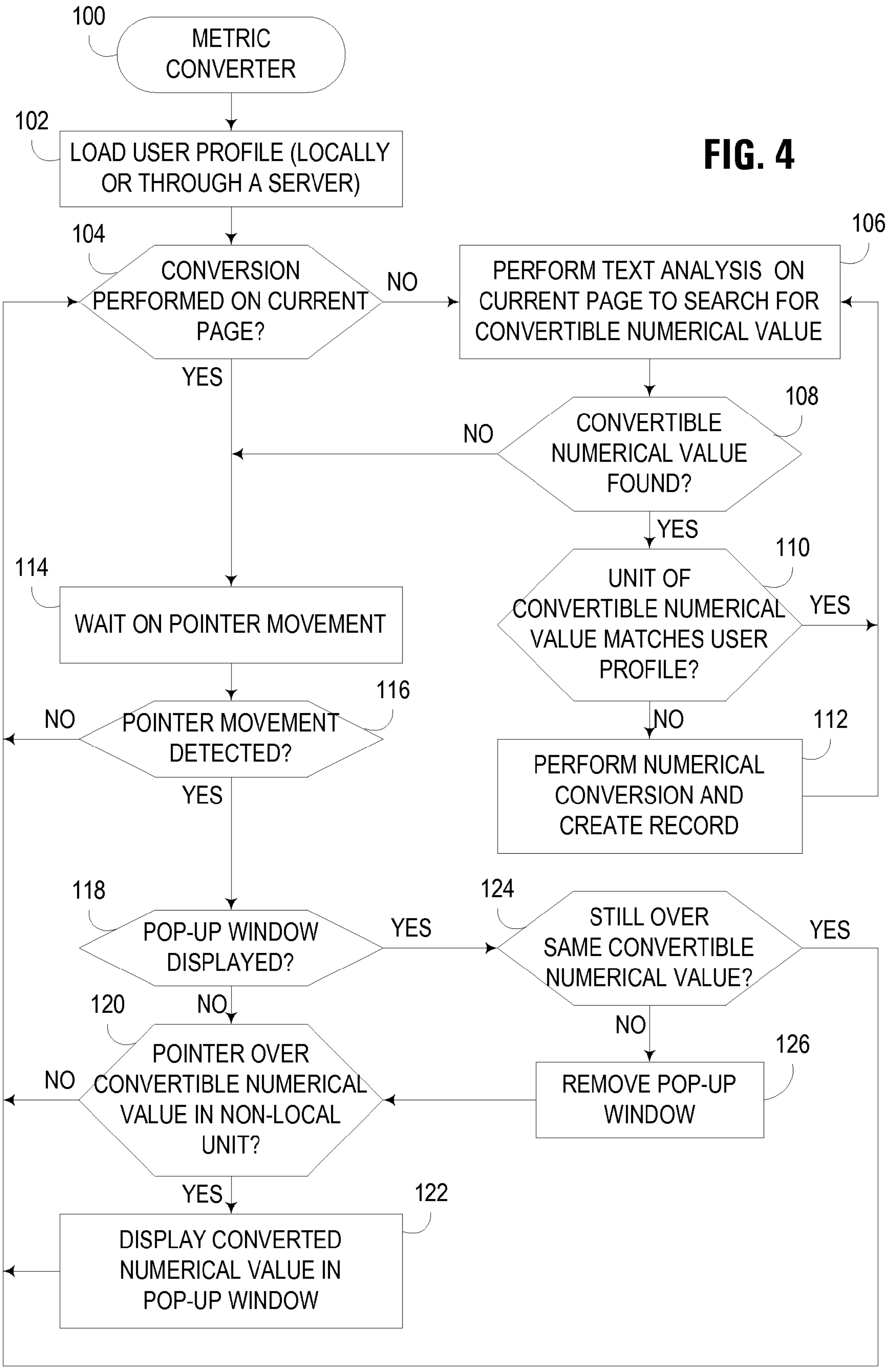
FIG. 4 is a flowchart illustrating the program flow of an alternate metric converter routine to that illustrated in FIG. 3.

Routine 50, it should be noted, performs both conversion of a convertible numerical value, and display of the converted numerical value, on-demand, and in response to pointer movement over a region including an appropriate convertible numerical value. In other embodiments, however, conversion may be performed prior to, and thus, non-responsive to pointer movement over a convertible numerical value. FIG. 4, for example, illustrates an alternate metric converter routine 100 that scans a web page and performs numerical conversions on all of the appropriate convertible numerical values in the web page when the web page is first displayed in the browser.

Routine 100 begins in block 102 by loading the user profile. Next, block 104 determines whether numerical conversion has already been performed on the current web page displayed in the browser. If not, control passes to block 106 to scan the web page and perform text analysis on the page to attempt to locate a convertible numerical value. Block 108 then determines whether a convertible numerical value was found, and if so, passes control to block 110 to determine whether the native unit for the convertible numerical value matches the local unit in the user profile. If so, no conversion is required, so control returns to block 106 to search for other convertible numerical values in the web page. If the units do not match, however, control passes to block 112 to perform the numerical conversion, and to store the converted numerical value. For example, it may be desirable for block 112 to create a record that identifies the convertible numerical value, the converted numerical value and the units associated with each, such that the record can later be retrieved when the pointer is disposed over a region incorporating the convertible numerical value. Upon completion of block 112, control returns to block 106 to search for other convertible numerical values in the web page.

Once all convertible numerical values have been processed, block 108 passes control to block 114. Likewise, control is passed to block 114 if block 104 determines that conversion has already been performed on the current web page.

Block 114 waits on pointer movement. If pointer movement is detected, block 116 passes control to block 118. Otherwise, control returns to block 104 to check whether a new page has been loaded for which conversion has not yet been performed.

If pointer movement is detected, block 118 determines whether a pop-up window is already displayed. Assuming that no window is currently displayed, control passes to block 120 to determine whether the pointer is disposed over a region including a convertible numerical value displayed in a non-local unit, e.g., by searching for a record generated in block 112 that corresponds to the convertible numerical value under the pointer. If so, control passes to block 122 to display the previously converted numerical value in a pop-up window adjacent the pointer, whereby control then returns to block 104.

Returning to block 118, if pointer movement is detected while the pop-up window is displayed, control passes to block 124 to determine whether the pointer is still disposed over the same convertible numerical value for which the pop-up window was generated. If so, control returns to block 104. Otherwise, block 124 passes control to block 126 to remove the pop-up window. Control then passes to block 120 to look for an appropriate convertible numerical value in the new region over which the pointer is disposed.

Various modifications may be made to the illustrated embodiments without departing from the spirit and scope of the invention. The invention therefore lies in the claims hereinafter appended.

What is claimed is:

1. A method of performing a numerical conversion, the method comprising:

detecting user positioning of a user manipulated pointer over a region of a web page displayed in a browser;

detecting a first numerical value in the region;

determining a native unit for the first numerical value;

determining a local unit for a user associated with the browser from a user profile associated with the user;

determining whether the native unit for the first numerical value matches the local unit for the user;

if the native unit for the first numerical value does not match the local unit for the user, converting the first numerical value to a second numerical value that matches the local unit for the user; and displaying the second numerical value and the local unit for the user in a pop-up window disposed adjacent to the user manipulated pointer and the first numerical value such that the first and second numerical values are concurrently displayed.

2. A method of performing a numerical conversion, the method comprising:

detecting user positioning of a user manipulated pointer over a convertible numerical value in a displayed portion of a computer document;

converting the convertible numerical value to a local unit associated with the user; and displaying the converted numerical value proximate the convertible numerical value in the displayed portion of the document.

3. The method of claim 2, wherein detecting user positioning of the user manipulated pointer over the convertible numerical value includes detecting a click event.

4. The method of claim 2, wherein displaying the converted numerical value is performed in response to detecting user positioning of the user manipulated pointer over the convertible numerical value.

5. The method of claim 2, wherein converting the convertible numerical value to the local unit is performed in response to detecting user positioning of the user manipulated pointer over the convertible numerical value.

6. The method of claim 2, wherein converting the convertible numerical value to the local unit is performed prior to detecting user positioning of the user manipulated pointer over the convertible numerical value.

7. The method of claim 6, further comprising scanning the document for convertible numerical values, wherein converting the convertible numerical value to the local unit is performed in response to detecting the convertible numerical value in the document.

8. The method of claim 2, wherein displaying the converted numerical value includes displaying the converted numerical value in a pop-up window adjacent to the pointer.

9. The method of claim 2, further comprising accessing user preference data associated with the user to determine the local unit associated with the user.

10. The method of claim 9, wherein the displayed portion of the document is displayed in a web browser, and the user preference data is stored locally in a client computer upon which the web browser executes, and wherein displaying the converted numerical value and converting the convertible numerical value to the local unit are performed by the client computer.

11. The method of claim 2, further comprising determining a native unit for the convertible numerical value from the document, wherein converting the convertible numerical value to the local unit includes converting the convertible numerical value from the native unit to the local unit.

12. The method of claim 11, wherein the convertible numerical value is a monetary value, and wherein the native and local units are units of currency.

13. The method of claim 11, wherein the native and local units are units of measurement.

14. The method of claim 11, wherein the native and local units are associated with different standards, and wherein the local unit is defined by a local standard associated with the user.

15. An apparatus, comprising:

at least one processor; and program code configured to be executed by the at least one processor to perform a numerical conversion by detecting user positioning of a user manipulated pointer over a convertible numerical value in a displayed portion of a computer document, converting the convertible numerical value to a local unit associated with the user, and displaying the converted numerical value proximate the convertible numerical value in the displayed portion of the document.

16. The apparatus of claim 15, wherein the program code is configured to display the converted numerical value in response to detecting user positioning of the user manipulated pointer over the convertible numerical value.

17. The apparatus of claim 15, wherein the program code is configured to convert the convertible numerical value to the local unit in response to detecting user positioning of the user manipulated pointer over the convertible numerical value.

18. The apparatus of claim 15, wherein the program code is configured to convert the convertible numerical value to the local unit prior to detecting user positioning of the user manipulated pointer over the convertible numerical value.

19. The apparatus of claim 15, wherein the program code is configured to display the converted numerical value by displaying the converted numerical value in a pop-up window adjacent to the pointer.

20. The apparatus of claim 15, wherein the document is a web page, and wherein the displayed portion of the document is displayed in a web browser.

21. The apparatus of claim 15, wherein the program code is further configured to determine a native unit for the convertible numerical value from the document, and wherein the program code is configured to convert the convertible numerical value to the local unit by converting the convertible numerical value from the native unit to the local unit.

22. The apparatus of claim 21, wherein the convertible numerical value is a monetary value, and wherein the native and local units are units of currency.

23. The apparatus of claim 21, wherein the native and local units are units of measurement.

24. The apparatus of claim 21, wherein the native and local units are associated with different standards, and wherein the local unit is defined by a local standard associated with the user.

25. A program product, comprising:

program code configured to perform a numerical conversion by detecting user positioning of a user manipulated pointer over a convertible numerical value in a displayed portion of a computer document, converting the convertible numerical value to a local unit associated with the user, and displaying the converted numerical value proximate the convertible numerical value in the displayed portion of the document; and a computer readable medium bearing the program code.

* * * * *